United States Patent
Luo

(10) Patent No.: US 9,930,412 B2
(45) Date of Patent: Mar. 27, 2018

(54) NETWORK SET-TOP BOX AND ITS OPERATING METHOD

(71) Applicants: BOE TECHNOLOGY GROUP CO., LTD., Beijing (CN); BEIJING BOE MULTIMEDIA TECHNOLOGY CO., LTD., Beijing (CN)

(72) Inventor: Xiaohu Luo, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/916,315

(22) PCT Filed: Sep. 30, 2015

(86) PCT No.: PCT/CN2015/091152
§ 371 (c)(1),
(2) Date: Mar. 3, 2016

(87) PCT Pub. No.: WO2016/141712
PCT Pub. Date: Sep. 15, 2016

(65) Prior Publication Data
US 2017/0048584 A1 Feb. 16, 2017

(30) Foreign Application Priority Data
Mar. 12, 2015 (CN) .......................... 2015 1 0108554

(51) Int. Cl.
*H04N 21/45* (2011.01)
*H04N 21/466* (2011.01)
(Continued)

(52) U.S. Cl.
CPC ... *H04N 21/4668* (2013.01); *H04N 21/25883* (2013.01); *H04N 21/2668* (2013.01);
(Continued)

(58) Field of Classification Search
None
See application file for complete search history.

(56) References Cited

U.S. PATENT DOCUMENTS

2002/0104087 A1* 8/2002 Schaffer ................. H04N 7/163
725/46
2003/0020744 A1* 1/2003 Ellis ....................... H04H 60/31
715/723
(Continued)

FOREIGN PATENT DOCUMENTS

CN        1711775 A    12/2005
CN        1758727 A     4/2006
(Continued)

OTHER PUBLICATIONS

First Office Action regarding Chinese Application No. 201510108554.8, dated Apr. 5, 2017. Translation provided by Dragon Intellectual Property Law Firm.
(Continued)

*Primary Examiner* — Cai Chen
(74) *Attorney, Agent, or Firm* — Harness, Dickey & Pierce, P.L.C.

(57) ABSTRACT

The present disclosure relates to the field of communication technology, and provides a network set-top box and its operating method. The operating method includes steps of selecting N types of television programs to be recommended to a user in accordance with a viewing record of the user; and after the set-top box is enabled by the user, determining from the N types of television programs M television programs not be played currently, and prompting the user for information about the M television programs. M and N are each an integer not less than 0.

11 Claims, 2 Drawing Sheets

---

101 — selecting N types of television programs to be recommended to a user in accordance with a viewing record of the user 102 — after the set-top box is enabled by the user, determining from the N types of television programs M television programs that have not yet been played currently, and prompting the user for information about the M television programs, M and N being each an integer not smaller than 0

(51) Int. Cl.
*H04N 21/258* (2011.01)
*H04N 21/2668* (2011.01)
*H04N 21/482* (2011.01)
*H04N 21/81* (2011.01)
*H04N 21/442* (2011.01)

(52) U.S. Cl.
CPC ... *H04N 21/44204* (2013.01); *H04N 21/4667* (2013.01); *H04N 21/4826* (2013.01); *H04N 21/812* (2013.01); *H04N 21/8126* (2013.01)

(56) References Cited

U.S. PATENT DOCUMENTS

| | | |
|---|---|---|
| 2004/0098743 A1 | 5/2004 | Gutta et al. |
| 2008/0172696 A1 | 7/2008 | Furusawa et al. |
| 2010/0125544 A1 | 5/2010 | Lee et al. |
| 2015/0334461 A1 | 11/2015 | Yu |
| 2017/0048584 A1 | 2/2017 | Luo |

FOREIGN PATENT DOCUMENTS

| | | |
|---|---|---|
| CN | 101036386 A | 9/2007 |
| CN | 102802086 A | 11/2012 |
| CN | 103313108 A | 9/2013 |
| CN | 103546773 A | 1/2014 |
| CN | 103686464 A | 3/2014 |
| CN | 103747343 A | 4/2014 |
| CN | 104168510 A | 11/2014 |
| CN | 104219576 A | 12/2014 |
| CN | 104301436 A | 1/2015 |
| CN | 104639984 A | 5/2015 |

OTHER PUBLICATIONS

International Search Report and Written Opinion of the International Searching Authority for International Application No. PCT/CN2015/091152, dated Jan. 11, 2016. Translation provided by Dragon Intellectual Property Law Firm.

Second Office Action regarding Chinese Application No. 201510108554.8, dated Oct. 9, 2017. Translation provided by Dragon Intellectual Property Law Firm.

* cited by examiner

NETWORK SET-TOP BOX AND ITS OPERATING METHOD

CROSS-REFERENCE TO RELATED APPLICATIONS

The present application is the U.S. National Phase of PCT Application No. PCT/CN2015/091152 filed on Sep. 30, 2015, which claims a priority of the Chinese patent application No. 201510108554.8 filed on Mar. 12, 2015, each of which are incorporated herein by reference in their entirety.

TECHNICAL FIELD

The present disclosure relates to the field of communication technology, in particular to a network set-top box and its operating method.

BACKGROUND

In the past, set-top box referred to an analog channel adder or an analog channel descrambler on the basis of a cable television network. Along with the rapid development of the digital video broadcasting and Internet, there is an increasing demand on information, and the set-top box has gradually become a device for receiving and processing the information, with a television as a display terminal.

Currently, there are various set-top boxes available in the market. For example, depending on the types of the received signals, the set-top boxes may include analog set-top boxes and digital set-top boxes, and depending on the signal transmission networks, the set-top boxes may include satellite transmission set-top boxes, optical cable set-top boxes and terrestrial transmission set-top boxes. Most of these set-top boxes are merely used to receive and process image signals and audio signals, and some of them may be used to provide limited interactive services, e.g., to show a desired advertisement to a user in accordance with his preferences.

However, along with the improvement of the living standard and the development of the communication and network technologies, it is insufficient for the sep-top boxes, which merely has a function of receiving and processing the image signals and the audio signals, to meet the user's demands and improve the user experience.

SUMMARY

An object of the present disclosure is to provide a network set-top box and its operating method, so as to prompt the user for a program to be recommended and played, thereby to improve the user experience.

In one aspect, the present disclosure provides in some embodiments an operating method for a network set-top box, including steps of: selecting N types of television programs to be recommended to a user in accordance with a viewing record of the user; and after the set-top box is enabled by the user, determining from the N types of television programs M television programs not be played currently, and prompting the user for information about the M television programs, M and N being each an integer not smaller than 0.

Further, the step of selecting the N types of television programs to be recommended to the user in accordance with the viewing record of the user includes: counting times and duration of each type of television programs viewed by the user in accordance with the viewing record of the user; multiplying the times of each type of television programs viewed by the user by a first predetermined weight to obtain a first score, multiplying the duration of each type of television programs viewed by the user by a second predetermined weight to obtain a second score, and adding the first score to the second score to obtain a total score for each type of television programs; and selecting the top N types of television programs with the high total scores as the television programs to be recommended to the user.

Further, subsequent to the step of selecting the N types of television programs to be recommended to the user in accordance with the viewing record of the user, the method includes storing information about the N types of television programs to be recommended to the user.

Further, subsequent to enabling the network set-top box by the user, the method further includes updating the viewing record of the user. The first weight and the second weight are set by the user, or are default values initially set for the network set-top box.

Further, prior to the step of counting the times and the duration of each type of television programs viewed by the user in accordance with the viewing record of the user, the method includes determining whether the television program is a live program, wherein, the television program is a live program, counting the times and the duration of the television program that have been viewed by the user.

Further, the information about the M television programs is prompted to the user by at least one of voice, a screen of the network set-top box, and a television screen connected to the network set-top box.

Further, the information about the M television programs includes names, channels, air time, and duration of the television programs.

In another aspect, the present disclosure provides in some embodiments a network set-top box, including: a processing module configured to select N types of television programs to be recommended to a user in accordance with a viewing record of the user; and a prompting module configured to, after the set-top box is enabled by the user, determine from the N types of television programs M television programs not be played currently, and prompt the user for information about the M television programs, M and N being each an integer not smaller than 0.

Further, the processing module includes: a counting unit configured to count times and duration of each type of television programs viewed by the user in accordance with the viewing record of the user; a calculation unit configured to multiply the times of each type of television programs viewed by the user by a first predetermined weight to obtain a first score, multiply the duration of each type of television programs viewed by the user by a second predetermined weight to obtain a second score, and add the first score to the second score to obtain a total score for each type of television programs; and a selecting unit configured to select the top N types of television programs with the high total scores as the television programs to be recommended to the user.

Further, the network set-top box includes a storage module configured to store information about the N types of television programs to be recommended to the user.

Further, the network set-top box includes an updating module configured to update the viewing record of the user. The first weight and the second weight are set by the user, or are default values initially set for the network set-top box.

Further, the processing module includes a determination unit configured to determine whether the television program is a live program, and the counting unit is configured to, when the television program is a live program, count the times and the duration of the television program viewed by the user.

Further, the prompting module includes at least one of: a voice prompting unit configured to prompt the user for the information about the M television programs by voice; a display prompting unit configured to display to the user the information about the M television programs by a screen of the network set-top box; and an information transmission unit configured to transmit the information about the M television programs to a television screen connected to the network set-top box, and display to the user the information about the M television programs by the television screen.

Further, the information about the M television programs includes names, channels, air time, and duration of the television programs.

According to the embodiments of the present disclosure, the network set-top box selects the television programs to be recommended to the user in accordance with the viewing record of the user, and when the network set-top box is enabled by the user, prompts the user for the information about the television programs to be recommended to the user that have not yet been played currently. As a result, it is able for the user to view the television programs of interest in time, thereby to improve the user experience.

DETAILED DESCRIPTION OF THE EMBODIMENTS

In order to make the objects, the technical solutions and advantages of the present disclosure more apparent, the present disclosure will be described hereinafter in conjunction with the drawings and embodiments.

The present disclosure provides in some embodiments a network set-top box and its operating method, so as to prompt a user for television programs to be recommended and played, thereby to improve the user experience.

First Embodiment

Figure 1:
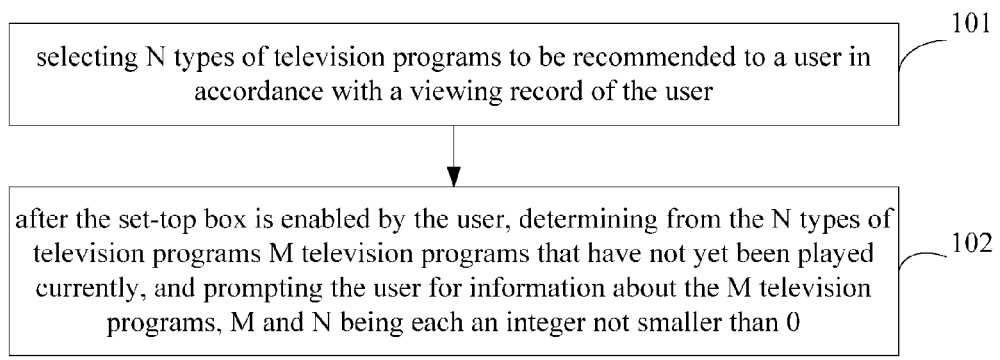
FIG. 1 is a flow chart of an operating method for a network set-top box according to one embodiment of the present disclosure.

The present disclosure provides in this embodiment an operating method for a network set-top box which, as shown in FIG. 1, Step 101 of selecting N types of television programs to be recommended to a user in accordance with a viewing record of the user, and Step 102 of, after the set-top box is enabled by the user, determining from the N types of television programs M television programs that have not yet been played currently, and prompting the user for information about the M television programs. M and N are each an integer not smaller than 0.

According to the embodiment of the present disclosure, the network set-top box selects the television programs to be recommended to the user in accordance with the viewing record of the user, and when the network set-top box is enabled by the user, prompts the user for the information about the television programs to be recommended to the user that have not yet been played currently. As a result, it is able for the user to view the television programs of interest in time, thereby to improve the user experience.

Alternatively, the step of selecting the N types of television programs to be recommended to the user in accordance with the viewing record of the user includes: counting times and duration of each type of television programs that have been viewed by the user in accordance with the viewing record of the user; multiplying the times of each type of television programs that have been viewed by the user by a first predetermined weight to obtain a first score, multiplying the duration of each type of television programs that have been viewed by the user by a second predetermined weight to obtain a second score, and adding the first score to the second score to obtain a total score for each type of television programs; and selecting the top N types of television programs with the high total scores as the television programs to be recommended to the user. The first weight and the second weight may be set by the user in accordance with the practical need, or may be default values initially set for the network set-top box.

Further, subsequent to the step of selecting the N types of television programs to be recommended to the user in accordance with the viewing record of the user, the method includes storing information about the N types of television programs to be recommended to the user.

Further, subsequent to enabling the network set-top box by the user, the method further includes updating the viewing record of the user. The first weight and the second weight are set by the user, or are default values initially set for the network set-top box.

Further, prior to the step of counting the times and the duration of each type of television programs that have been viewed by the user in accordance with the viewing record of the user, the method includes determining whether or not the television program is a live program, and when the television program is a live program, counting the times and the duration of the television program that have been viewed by the user.

Alternatively, the information about the M television programs is prompted to the user by at least one of voice, a screen of the network set-top box, and a television screen connected to the network set-top box.

Further, the information about the M television programs includes names, channels, air time, and duration of the television programs.

Second Embodiment

Figure 2:
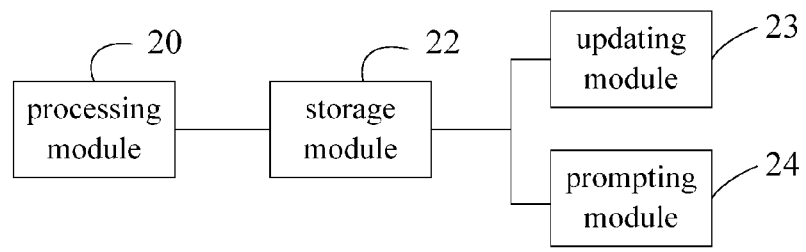
FIG. 2 is a block diagram of the network set-top box according to one embodiment of the present disclosure.

The present disclosure further provides in this embodiment a network set-top box which, as shown in FIG. 2, includes a processing module 20 configured to select N types of television programs to be recommended to a user in accordance with a viewing record of the user, and a prompting module 24 configured to, after the set-top box is enabled by the user, determine from the N types of television programs M television programs that have not yet been played currently, and prompt the user for information about the M television programs. M and N are each an integer not less than 0.

According to the embodiment of the present disclosure, the network set-top box selects the television programs to be recommended to the user in accordance with the viewing record of the user, and when the network set-top box is enabled by the user, prompts the user for the information about the television programs to be recommended to the user that have not yet been played currently. As a result, it is able for the user to view the television programs of interest in time, thereby to improve the user experience.

Further, the processing module includes: a counting unit configured to count times and duration of each type of television programs that have been viewed by the user in accordance with the viewing record of the user; a calculation unit configured to multiply the times of each type of television programs that have been viewed by the user by a first predetermined weight to obtain a first score, multiply the duration of each type of television programs that have been viewed by the user by a second predetermined weight to obtain a second score, and add the first score to the second score to obtain a total score for each type of television programs; and a selecting unit configured to select the top N types of television programs with the high total scores as the television programs to be recommended to the user. The first weight and the second weight may be set by the user in accordance with the practical need, or may be default values initially set for the network set-top box.

Further, the network set-top box includes a storage module 22 configured to store information about the N types of television programs to be recommended to the user, and an updating module 23 configured to update the viewing record of the user.

Further, the processing module includes a determination unit configured to determine whether or not the television program is a live program, and the counting unit is configured to, wherein, when the television program is a live program, count the times and the duration of the television program that have been viewed by the user.

Further, the prompting module includes at least one of: a voice prompting unit configured to prompt the user for the information about the M television programs by voice; a display prompting unit configured to display to the user the information about the M television programs by a screen of the network set-top box; and an information transmission unit configured to transmit the information about the M television programs to a television screen connected to the network set-top box, and display to the user the information about the M television programs by the television screen.

Further, the information about the M television programs includes names, channels, air time, and duration of the television programs.

Third Embodiment

Figure 3:
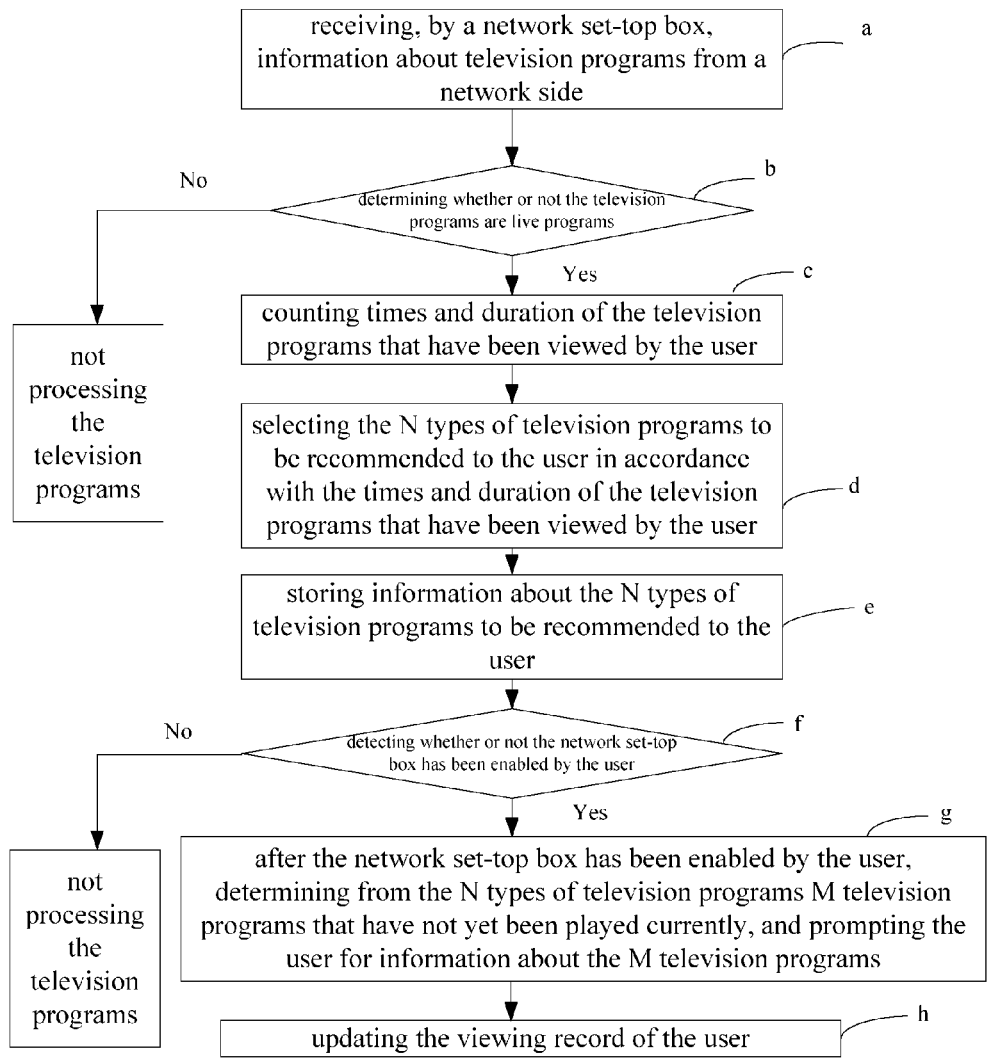
FIG. 3 is another flow chart of the operating method for the network set-top box according to one embodiment of the present disclosure.

The operating method for the network set-top box will be described hereinafter in conjunction with the drawings. As shown in FIG. 3, the operating method includes the following steps.

Step a: receiving, by the network set-top box, information about the television programs from a network side.

The information about the television programs are received by the network set-top box from the network side via a wired or wireless network, and the information about the television programs includes, but not limited to, names, channels, air time, and duration of the television programs.

Step b: determining whether or not the television programs are live programs, and proceeding to Step c when the television programs are live programs, otherwise not processing the television programs.

The network set-top box may determine whether or not each type of television programs are live programs in accordance with the received information about the television programs, e.g., a football live program or a Spring Festival Gala live show. When the television programs are live programs, the network set-top box may count the times and duration of the television programs that have been viewed by the user. When the television programs are not live programs, e.g., a recorded television drama, the television programs are not processed.

Step c: counting the times and duration of the television programs that have been viewed by the user.

For each type of the received television programs, the network set-top box may count the times and duration of the television programs, e.g., the live World Cup program, which have been viewed by the user.

Step d: selecting the N types of television programs to be recommended to the user in accordance with the times and duration of the television programs that have been viewed by the user.

To be specific, the times of each type of television programs that have been viewed by the user may be multiplied by a first predetermined weight to obtain a first score, the duration of each type of television programs that have been viewed by the user may be multiplied by a second predetermined weight to obtain a second score, and the first score is added to the second score to obtain a total score for each type television programs. Then, the top N types of television programs with the high total scores may be selected as the television programs to be recommended to the user. N may be 3. The first weight and the second weight may be set by the user in accordance with the practical need, or may be default values initially set for the network set-top box. For example, when the live World Cup program is one of the top N types of television programs with the high total scores, it may be selected as the television program to be recommended to the user.

Step e: storing information about the N types of television programs to be recommended to the user.

Step f: detecting whether the network set-top box has been enabled by the user, and when the network set-top box has been enabled, proceeding to Step g, otherwise not processing the television programs.

Step g: after the network set-top box has been enabled by the user, determining from the N types of television programs M television programs that have not yet been played currently, and prompting the user for information about the M television programs.

To be specific, a timer may be added within the network set-top box, and after the network set-top box has been enabled by the user, the timer starts to count. A value of the timer may be read every two seconds, and when the value is not greater than a threshold (e.g., 10 s), it means the network set-top box has been enabled by the user a little while ago. At this time, the value of the timer is not read any more, and the M television programs that have not yet been played currently are prompted to the user. The M television programs are just the television programs which belong to the N types of television programs and which have not yet been played currently. When the N types of television programs to be recommended to the user currently are over, no prompt is sent to the user. For example, when a certain World Cup football game is being played currently, the information about the World Cup football game may be prompted to the user.

To be specific, the information about the M television programs may be prompted to the user by voice, e.g., repeated three times. In addition, the information about the M television programs may also be displayed, e.g., cyclically, to the user by a screen of the network set-top box. Alternatively, the information about the M television programs may be transmitted to a television screen connected to the network set-top box, and then displayed to the user by the television screen. The information about the M television programs includes, but not limited to, names, channels, air time, and duration of the television programs.

Step h: updating the viewing record of the user.

When the network set-top box is enabled by the user next time, N' types of television programs to be recommended to the user may be selected in accordance with the updated viewing record, and then Step g may be repeated.

According to the embodiment of the present disclosure, the network set-top box selects the television programs to be recommended to the user in accordance with the viewing record of the user, and when the network set-top box is enabled by the user, prompts the user for the information about the television programs to be recommended to the user that have not yet been played currently. As a result, it is able for the user to view the television programs of interest in time, thereby to improve the user experience. In addition, it is merely required to provide a timer and/or a voice prompting module in the existing network set-top box, so the added cost is relatively low.

The functional members described in the specification are referred to as modules, so as to emphasize the independence of the implementation in a more particular manner.

According to the embodiments of the present disclosure, the modules may be implemented by software, so as to be executed by various processors. For example, an identified, executable code module may comprise one or more physical or logical blocks including computer instructions, and the module can be constructed as an image, a process or a function. Even so, the executable codes of the identified modules are unnecessary to be physically located together, but may comprise different instructions stored in different locations. When these instructions are logically combined together, they form the modules and achieve the prescribed purposes of the modules.

Actually, the executable code module may be a single instruction or a plurality of instructions, and can even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit comprises a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

In the embodiments of the present disclosure, the order of the steps is not limited to the serial numbers thereof. For a person skilled in the art, any change in the order of the steps shall also fall within the scope of the present disclosure if without any creative effort.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An operating method for a network set-top box, comprising steps of:
    selecting N types of television programs to be recommended to a user in accordance with a viewing record of the user; and
    after the set-top box is enabled by the user, determining from the N types of television programs M television programs not be played currently, and prompting the user for information about the M television programs by at least one of screen of the network set-top box and a television screen connected to the network set-top box, M and N being each an integer not smaller than 0, wherein the selecting the N types of television programs to be recommended to the user in accordance with the viewing record of the user further comprises:
    counting times and duration of each type of television programs viewed by the user in accordance with the viewing record of the user;
    multiplying the times of each type of television programs viewed by the user by a first predetermined weight to obtain a first score, multiplying the duration of each type of television programs viewed by the user by a second predetermined weight to obtain a second score, and adding the first score to the second score to obtain a total score for each type of television programs; and
    selecting the top N types of television programs with the high total scores as the television programs to be recommended to the user.

2. The operating method according to claim 1, wherein subsequent to the step of selecting the N types of television programs to be recommended to the user in accordance with the viewing record of the user, the method further comprises storing information about the N types of television programs to be recommended to the user.

3. The operating method according to claim 1, wherein subsequent to enabling the network set-top box by the user, the method further comprises updating the viewing record of the user.

4. The operating method according to claim 1, wherein the first weight and the second weight are set by the user, or are default values initially set for the network set-top box.

5. The operating method according to claim 1, wherein prior to the step of counting the times and the duration of each type of television programs viewed by the user in accordance with the viewing record of the user, the method further comprises determining whether the television program is a live program, wherein, when the television program is a live program, counting the times and the duration of the television program viewed by the user.

6. The operating method according to claim 1, wherein the information about the M television programs comprises names, channels, air time, and duration of the television programs.

7. A network set-top box, comprising:
    a processing module configured to select N types of television programs to be recommended to a user in accordance with a viewing record of the user;
    a prompting module configured to, after the set-top box is enabled by the user, determine from the N types of television programs M television programs played currently, and prompt the user for information about the M television programs through at least one of a voice and a screen display, M and N being each an integer not smaller than 0;

a counting unit configured to count times and duration of each type of television programs viewed by the user in accordance with the viewing record of the user;

a calculation unit configured to multiply the times of each type of television programs viewed by the user by a first predetermined weight to obtain a first score, multiply the duration of each type of television programs viewed by the user by a second predetermined weight to obtain a second score, and add the first score to the second score to obtain a total score for each type of television programs; and a selecting unit configured to select the top N types of television programs with the high total scores as the television programs to be recommended to the user, wherein the prompting module comprises at least one of:

a display prompting unit configured to display to the user the information about the M television programs by a screen of the network set-top box; and an information transmission unit configured to transmit the information about the M television programs to a television screen connected to the network set-top box, and display to the user the information about the M television programs by the television screen.

8. The network set-top box according to claim 7, further comprising:

a storage module configured to store information about the N types of television programs to be recommended to the user.

9. The network set-top box according to claim 7, wherein the first weight and the second weight are set by the user, or are default values initially set for the network set-top box.

10. The network set-top box according to claim 7, wherein the processing module further comprises a determination unit configured to determine whether the television program is a live program, and the counting unit is configured to, when the television program is a live program, count the times and the duration of the television program viewed by the user.

11. The network set-top box according to claim 7, wherein the information about the M television programs comprises names, channels, air time, and duration of the television programs.

* * * * *